March 3, 1942. D. E. O'BEIRNE Re. 22,044
OBSERVATION UNIT FOR BEES OR THE LIKE
Original Filed Aug. 15, 1938
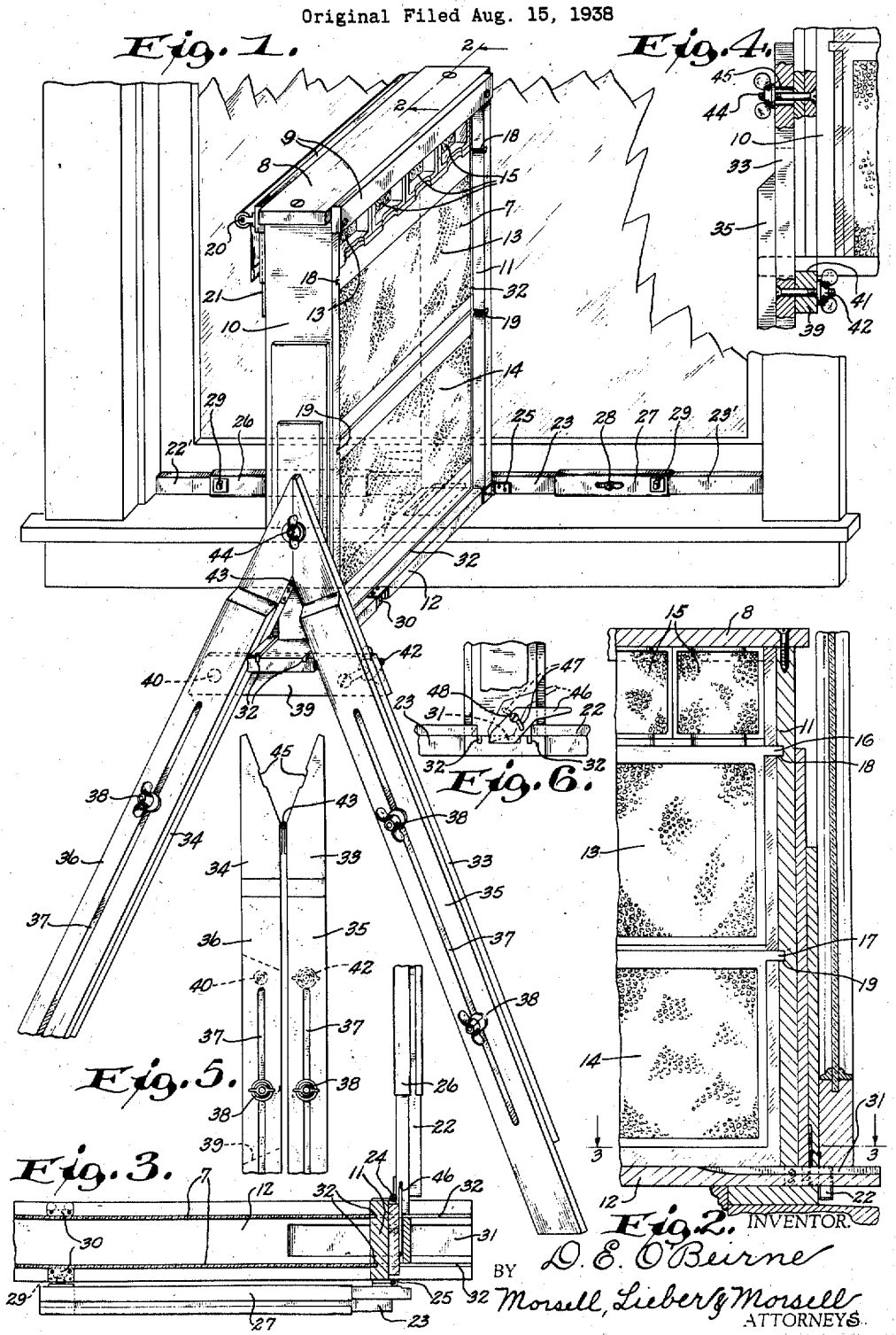
INVENTOR.
D. E. O'Beirne
BY
Morsell, Lieber & Morsell
ATTORNEYS.

Reissued Mar. 3, 1942

Re. 22,044

UNITED STATES PATENT OFFICE 22,044

OBSERVATION UNIT FOR BEES OR THE LIKE

Donald E. O'Beirne, Waukesha, Wis.

Original No. 2,170,210, dated August 22, 1939, Serial No. 224,889, August 15, 1938. Application for reissue August 2, 1941, Serial No. 405,222

16 Claims. (Cl. 6—1)

This invention relates generally to improvements in the art of housing bees or the like, and relates more specifically to improvements in the construction and operation of bee observation units and to the method of admitting bees to such units.

Generally stated, an object of the present invention is to provide an improved observation unit for bees or the like, which may be readily constructed and operated, and which is moreover highly efficient and practical in operation.

It has long been common practice for schools, hospitals, and other institutions, and for persons generally interested in the study and raising of bees, to observe their habits through glass enclosures or cages. Since the activity of the bee is greatly increased in light and well ventilated places, it is highly desirable to position the observation units close to windows or similar openings. It is also desirable to position such units near a window in order to enable passage of the bees to and from their natural habitat by means of a suitable passageway communicating with the ambient atmosphere, and without necessitating movement or repositioning of the observation unit when it is desired to free the bees. It is moreover desirable to provide a substantial support for such an observation cage, in order to prevent the cage from falling and delivering the bees into the building, and also in order to prevent undesirably disturbing the bees while at work. Since windows are of various sizes and styles, any mode of attaching an observation cage to a window should be adapted for application to any window so as to permit universal use of the cage. A practical observation unit should also be provided with suitable means for completely confining the bees when desired, and for freeing them when the observations have been completed, and should moreover be provided with means for adequately protecting the bees while in the unit.

It is therefore a more specific object of my present invention to provide a new and useful observation unit which in fact embodies all of the above mentioned desirable features, and which may be manufactured and sold at moderate cost.

Another specific object of this invention is to provide an improved observation unit which may be readily assembled and adjusted for association with any standard window, regardless of the width of the sill or the height thereof from the floor.

A further specific object of my invention is to provide an adjustable observation unit for bees or the like, which may be readily dismantled and folded into compact form for shipment and handling.

Still another specific object of this invention is to provide a simplified, portable and conveniently adjustable observation unit adapted to be effectively locked in collapsed as well as in normal open position, and which is extremely durable in construction.

Another specific object of the invention is to provide an improved observation unit capable of being mounted on a window sill or the like, without destroying the utility of the window.

An additional specific object of the invention is to provide a new and useful bee observation unit associable with the window of a building, and having improved means for permitting ingress and egress of the bees to and from the unit from the ambient atmosphere, the area of the passageway being controllable from within the building.

Still another specific object of the invention is to provide an observation unit for bees wherein the bees are effectively protected from undesirable climatic conditions, such as cold weather and extraordinary light.

A further specific object of my present invention is to provide an observation unit of such size that the complete cycle of brood rearing may take place while portraying a constant perspective of any individual bee from the time the bee enters the unit until it departs therefrom, and without obstructing the observer's view.

A further object of my invention is to provide an improved structure for supporting the brood frame sections of a bee observation unit while permitting independent removal thereof.

Still another object of my invention is to provide an improved method of effecting bee observation, and of causing the bees to enter an observation unit located within a building or the like without injuring the bees or permitting escape thereof.

A further object of the invention is to provide an improved process of admitting bees to an observation unit, whereby the cage while assembled may be filled with bees to capacity with minimum danger to the operator.

These and other specific objects of the invention will be apparent from the following detailed description.

A clear conception of the several features constituting the present improvements, and of the mode of constructing and of utilizing observation units built in accordance with my present invention, may be had by referring to the drawing accompanying and forming a part of this specification wherein the reference characters designate the same or similar parts in the various views:

Fig. 1 is a perspective view of the assembled observation unit, showing the same applied to a fragment of a standard window;

Fig. 2 is a vertical section through a fragment of the observation unit and through a portion of the window, the section being taken along the line 2—2 of Fig. 1;

Fig. 3 is a transverse horizontal section through the lower portion of the unit, taken along the line 3—3 of Fig. 2, and showing one of the sill adapters folded into locking engagement with the unit as when not in use;

Fig. 4 is a part sectional side view of the portion of the observation unit remote from the window, showing the supporting structure therefor;

Fig. 5 is an end view of the supporting easel, showing the same collapsed; and

Fig. 6 is an end view of the lower portion of the observation unit looking toward the control mechanism for the bee inlet and outlet runway, a portion of the structure being broken away to reveal the shutter and the shutter being shown in dot-and-dash lines in open position.

While the invention has been shown herein as being specifically applied to a bee observation unit adapted to be placed within a room, it is not desired to unnecessarily restrict the scope by such specific embodiment.

Referring to the drawing, the improved observation unit comprises in general a cage having substantially vertical opposite transparent sides 7; a removable top or head board 8; top rails 9 at the opposite sides of the board 8; vertical end pieces 10, 11; and a base 12. This observation cage normally contains several honey comb sections 15, and a plurality of brood frames 13, 14 which are disposed beneath the sections 15 and which may be inserted within or removed from the observation cage independently of each other when one of the glass sides 7 is removed. The upper brood frame 13 is provided with opposite end lugs 16 which are cooperable with grooves 18 in the end walls 10, 11 to suspend the frame 13, and the lower brood frame 14 is likewise provided with opposite end lugs 17 which are cooperable with other grooves 19 in the end walls 10, 11 to likewise suspend the frame 14, and with this assemblage either of the brood frames 13, 14 may be readily removed or inserted within the cage without disturbing the others. One or both of the top rails 9 may be provided with an adjustable window shade 20 for regulating the exposure of the cage to the light, and an additional glass plate 21 may be added to either one or both sides of the cage so as to provide insulating air spaces for the transparent areas of the cage.

The base 12 is provided with improved sill adapters 22, 23 which are secured to this base by means of hinges 24, 25. These sill adapters 22, 23 are telescopic and may be lengthened or shortened by means of extensions 26, 27 respectively, and adjustment bolts 28 coacting with the tubular extensions. The bolts 28 are not absolutely necessary, but the sill adapters should preferably be provided with latching means for retaining the same in collapsed position against the cage as shown in Fig. 3. This latching means comprises a headed lug 29 formed on each extension 26, 27 and cooperable with a resilient socket 30 formed on the adjacent side of the base 12. The base 12 also has a groove or runway 31 formed therein which serves as an entrance and exit passage for the bees, and this base as well as the end walls 10, 11 is also provided with grooves 32 into which the glass sides 7 are fitted so as to complete the enclosure.

While one end of the cage is supported from the window sill, the opposite end thereof is preferably provided with an easel or floor support as shown in Fig. 1. This floor support comprises legs 33, 34 which are swingably interconnected and are provided with adjusting bolts 38, and extensible legs 35, 36 formed with elongated slots 37 coacting with the bolts 38. The leg 34 has a bracket 39 swingably connected thereto by a pivot 40, and the bracket 39 is adapted to be swung transversely into a position adjoining the leg 33 and when so positioned may be attached to the leg 33 by means of a bolt 42. Such transverse disposition of the bracket 39 places this bracket in a position for engagement with a groove 41 formed in the lower portion of the base 12, and the adjustable leg sections 35, 36 may obviously be so positioned that the unit will be held in desired position with respect to the floor. The legs 33, 34 are swingably connected by a hinge 43, and are provided with notches 45 which are adapted to embrace a retaining bolt 44 carried by the inner end wall 10 of the unit, and when the wing nut which coacts with the bolt 44 is adjusted to clamp the retaining washer in position, the easel provides a rigid support for the unit. The end wall 11 beneath which the passage or groove 31 extends, is provided with an adjustable closure or valve 46 having a curved slot 47 therein which is cooperable with a fixed pivot 48 so as to permit opening and closing of the runway. By adjusting the slide or valve 46, the bees may be either confined within the unit, or the passage 31 may be opened more or less so as to regulate the entry or escape of the bees.

Ordinarily the observation unit would be assembled by first positioning the end walls or pieces 10, 11 upon the base 12, and the top rails 9 may then be properly positioned relative to the walls 10, 11. One of the glass sides 7 may thereafter be slid into proper position along the grooves 32, and either one or both of the brood frames 13, 14 may be thereafter inserted through the other open side of the cage. After proper assembly of the brood frames has been effected, the remaining glass side 7 may be slid into position whereupon the unit is ready for the reception of the bees. The bees may be inserted within the unit together with the brood frames 13, 14, but this practice has proven rather dangerous to persons assembling the unit as well as injurious to the bees. In accordance with my improved method, I fill the unit with bees by admitting them through the opening at the top of the unit between the side rails 9 after the empty brood frames 13, 14 have been inserted and before the top plate 8 is applied to the cage. I insert the bees into a funnel having its discharge opening in open communication with the open top of the observation unit, and by placing a cloth or screen containing carbolic acid solution above the top of the funnel. The obnoxious nature of the carbolic acid gases then causes the bees to travel downwardly into the unit and the admission of the bees may be augmented by gently shaking the funnel and the unit. When the desired number of bees have been thus admitted to the unit, the honey sections 15 may be positioned therein and the removable head board 8 may be applied and fastened in place.

If the unit is positioned within an undesirably hot or cold building, the extra glass plates 21 may be provided and these plates produce insulating spaces or air pockets at opposite sides of the cage and thus protect the bees. If the exposure to strong light is undesirable, the unit may also be provided with curtain shades 20 which may be raised or lowered to any desired extent so as to further protect the insects. Application of these shades 20 may also aid the observer in viewing the colony through unshaded portions of the unit, by providing a dark background on the opposite side of the cage. The shades 20 may be mounted directly on the removable side rails 9, and the auxiliary glass plates 21 may be fitted in slides secured to the end walls 10, 11.

When the observation unit is in normal use, the bees may either be confined within the unit, or freed therefrom, by manipulation of the slide valve 46. This valve 46 may obviously be set in any desired position from within the building and without disturbing the window with which the unit is associated, to either enlarge or diminish the effective area of the bee passage 31, and the valve is preferably so constructed that it will not entirely close off this passage and will permit at least limited ventilation of the interior of the unit.

From the foregoing specific description it will be noted that the telescopic sill adapters 22, 23 which are fastened to the base 12 by means of the hinges 24, 25, will permit the unit to be readily applied to the sill of an ordinary vertically adjustable window. The adapters 22, 23 are shaped for snug engagement with the window sill as shown in Fig. 2, and the tubular extensions 26, 27 which are slidable relative to the adapters are thus adjustable to conform with windows of various widths. For very wide windows, additional extension bars 22', 23' may be added as shown in Fig. 1, and the bolt 28 is merely provided in order to retain the extensions and the bars cooperating therewith in proper position. When the sill adapters are collapsed, they are held in place against the opposite sides of the base 12 by means of the lugs 29 cooperating with the resilient sockets 30, and it is also to be noted that when the unit is associated with a window, normal opening and closing of the window is not interfered with since the lower portion of the window is adapted to snugly coact with the top of the sill adapter.

It will also be noted that the easel provided at the opposite end of the unit constitutes a readily adjustable support cooperating with the sill adapter in order to maintain the unit in substantially horizontal position. This easel which may be conveniently adjusted to various heights by manipulating the wing nuts coacting with the bolts 38 may also be readily removed from the unit and collapsed into compact form for handling and shipment. The cross bar or bracket 39 when positioned as shown in Fig. 1 provides a rigid brace for the easel and prevents collapse thereof when in use, and this bracket 39 may obviously be swung into alinement with the leg 36 as shown in Fig. 5, when the easel is collapsed. When the easel is properly assembled and the several wing nuts of the clamping bolts are properly tightened, there is no danger of having the unit displaced from its moorings. The improved observation unit has proven highly satisfactory in actual commercial use and can be manufactured and sold at moderate cost. The improved method of admitting bees to the unit may also be practised without danger of having the bees enter the building and without injuring the bees, since the fumes are not injurious to the insects.

It should be understood that it is not desired to limit this invention to the exact details of construction or to the precise mode of operation, herein shown and described, for various modifications within the scope of the claims may occur to persons skilled in the art.

I claim:

1. A bee observation unit, comprising, a bee confining cage having an observation opening therethrough, an elongated sill adapter secured to one end of the cage and formed for disposition between a window and its sill, and a support at the opposite end of said cage.

2. A bee observation unit, comprising, a bee confining cage having an observation opening therethrough, a longitudinally adjustable elongated sill adapter secured to one end of the cage and formed for disposition between a window and its sill, and a vertically adjustable floor support at the opposite end of said cage.

3. A bee observation unit, comprising, a bee confining cage having an observation opening therethrough, a pair of longitudinally adjustable elongated sill adapters secured to one end of the cage and formed for disposition between a window and its sill, said sill adapters being foldable along and attachable to the sides of said cage, and a vertically adjustable floor support at the opposite end of said cage, said floor support being detachable from said cage.

4. A bee observation unit, comprising, a bee confining cage having an observation opening therethrough, a sill adapter secured to one end of the cage and formed for disposition on a window sill, and a bee exit communicating through the window opening with the outer atmosphere.

5. A bee observation unit, comprising, a bee confining cage having an observation opening therethrough, a support at one end of said cage, a sill adapter secured to the opposite end of the cage and being formed for disposition between a window and its sill, and a bee runway communicating directly with the outside past the sill adapter.

6. A bee observation unit, comprising, a bee confining cage having an observation opening therethrough, a sill adapter secured to one end of the cage and formed for disposition on a window sill, a bee exit communicating through the window with the outer atmosphere, and a valve for controlling the effective area of said exit.

7. A bee observation unit, comprising, a bee confining cage having an observation opening therethrough, a support at one end of said cage, a sill adapter secured to the opposite end of the cage and formed for disposition between a window and its sill, a runway communicating directly with the outside past the sill adapter, and a slide operable from within the room for opening and closing said runway.

8. A bee housing unit, comprising, a bee confining cage, an adjustable window sill adapter secured to one end of said cage, and an adjustable floor support at the opposite end of said cage.

9. A bee housing unit, comprising, a bee confining cage, an adjustable window sill adapter secured to one end of said cage, and a passageway communicating directly with the outer atmosphere past the sill adapter.

10. A bee housing unit, comprising, a bee confining cage, a window sill adapter secured to one end of said cage, a passageway communicating with the outside past the sill adapter, and a floor support at the opposite end of the cage.

11. A bee housing unit, comprising, a bee confining cage, a window sill adapter secured to one end of said cage, a passageway communicating with the outside past the sill adapter, and means for controlling the area of said passageway from within the building.

12. A bee housing unit, comprising, a bee confining cage, a window sill adapter secured to one end of said cage, a passageway communicating with the outside past the sill adapter, means for controlling the area of said passageway from within the building, and a vertically adjustable floor support at the opposite end of said cage.

13. A bee observation unit comprising a bee confining cage having a pair of fixed ends in vertically disposed spaced relation and, therebetween, opposite transparent sides at least one of which is removable, a plurality of superposed brood frames disposed between the transparent sides, and coacting means on the frames and cage ends affording (1) a support to the brood frames, each independently of the others, and (2) a restraint against movement thereof in any but a sidewise direction, the removable transparent side acting normally to prevent such sidewise movement with consequent removal of the frames from the cage.

14. A bee observation unit comprising a bee confining cage, a plurality of brood frames within the cage, coacting means on the frames and cage affording (1) a support to the frames, each independently of the others, and (2) a restraint against movement thereof in any but a sidewise direction, and a transparent side removably affixed to the cage acting normally to prevent sidewise movement of the frames therewithin with consequent removal thereof from the cage.

15. A bee observation unit comprising a bee confining cage, means associated with said cage for detachably mounting the same from the window structure of a building and cooperating with the cage to fill the unoccupied space within the opening of the window structure whereby to provide a closure therefor, means forming a passage through the closure to communicate with the outer atmosphere, and means adjacent the closure for opening and closing said passage from within the building.

16. A bee observation unit comprising a bee confining cage, means extended laterally from the cage and cooperating therewith to provide a closure for the unoccupied space within the opening of a window structure from which the cage is adapted to be mounted, means forming a passage through the closure to communicate with the outer atmosphere, and means adjacent the closure for opening and closing said passage from within the building.

DONALD E. O'BEIRNE.